US007853987B2

(12) United States Patent
Balasubramanian et al.

(10) Patent No.: US 7,853,987 B2
(45) Date of Patent: Dec. 14, 2010

(54) POLICY LANGUAGE AND STATE MACHINE MODEL FOR DYNAMIC AUTHORIZATION IN PHYSICAL ACCESS CONTROL

(75) Inventors: Meenakshi Balasubramanian, Bangalore (IN); Arul Ganesh, Bangalore (IN); Namit Chaturvedi, Ujjain (IN); Atish Datta Chowdhury, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 644 days.

(21) Appl. No.: 11/545,200

(22) Filed: Oct. 10, 2006

(65) Prior Publication Data

US 2008/0086643 A1 Apr. 10, 2008

(51) Int. Cl.
*G06F 7/04* (2006.01)
*G06F 17/00* (2006.01)
*G06F 13/00* (2006.01)

(52) U.S. Cl. ...................... 726/2; 726/1; 726/9; 726/20

(58) Field of Classification Search ..................... 726/9, 726/20, 1–2

See application file for complete search history.

(56) References Cited

U.S. PATENT DOCUMENTS

| | | | | |
|---|---|---|---|---|
| 5,301,100 | A | 4/1994 | Wagner | |
| 5,563,805 | A | 10/1996 | Arbuckle et al. | |
| 5,817,993 | A * | 10/1998 | Kamani et al. | 187/316 |
| 5,875,432 | A | 2/1999 | Sehr | |
| 6,119,183 | A | 9/2000 | Briel et al. | |
| 6,647,388 | B2 | 11/2003 | Numao et al. | |
| 7,047,328 | B1 * | 5/2006 | Rosner et al. | 710/25 |
| 7,055,136 | B2 | 5/2006 | Dzoba et al. | |
| 7,982,044 | | 7/2006 | Gould et al. | |
| 7,127,550 | B1 * | 10/2006 | Lin | 711/103 |
| 7,212,426 | B2 | 5/2007 | Park et al | |
| 7,376,839 | B2 * | 5/2008 | Carta et al. | 713/185 |
| 2001/0000814 | A1 | 5/2001 | Montgomery et al. | |
| 2002/0013934 | A1 | 1/2002 | Xie et al. | |
| 2002/0023232 | A1 | 2/2002 | Serani | |
| 2002/0178003 | A1 | 11/2002 | Gehrke | |
| 2003/0023874 | A1 * | 1/2003 | Prokupets et al. | 713/201 |
| 2003/0051155 | A1 * | 3/2003 | Martin | 713/201 |
| 2003/0066021 | A1 | 4/2003 | Reggiani et al. | |

(Continued)

FOREIGN PATENT DOCUMENTS

EP 0886 246 A2 12/1998

(Continued)

OTHER PUBLICATIONS

W. Thomas, "Languages, Automata, and Logic", Handbook of Formal Languages, G. Rozenberg and A. Salomann, editors, vol. III, Springer, New York, May 1996, 75 pp.*

(Continued)

*Primary Examiner*—Kaveh Abrishamkar
*Assistant Examiner*—Trang Doan
(74) *Attorney, Agent, or Firm*—Schiff Hardin LLP

(57) ABSTRACT

An automaton capable of providing an access control decision upon receiving an access control request is produced by processing context based access control policies specified in a formal descriptive language, and by converting the context based access control policies to the automaton.

21 Claims, 8 Drawing Sheets

U.S. PATENT DOCUMENTS

| | | | | |
|---|---|---|---|---|
| 2003/0106062 | A1* | 6/2003 | Shteyn et al. | 725/78 |
| 2004/0088587 | A1* | 5/2004 | Ramaswamy et al. | 713/202 |
| 2004/0193607 | A1* | 9/2004 | Kudo et al. | 707/9 |
| 2004/0250112 | A1 | 12/2004 | Valente et al. | |
| 2005/0050482 | A1 | 3/2005 | Keller et al. | |
| 2005/0051620 | A1 | 3/2005 | Diluoffo et al. | |
| 2005/0052275 | A1 | 3/2005 | Houle | |
| 2005/0080838 | A1 | 4/2005 | Colby et al. | |
| 2005/0114655 | A1 | 5/2005 | Miller et al. | |
| 2005/0114657 | A1 | 5/2005 | Kumar et al. | |
| 2005/0125674 | A1* | 6/2005 | Nishiki et al. | 713/182 |
| 2005/0171982 | A1 | 8/2005 | Deo et al. | |
| 2005/0171983 | A1 | 8/2005 | Deo et al. | |
| 2005/0177658 | A1 | 8/2005 | Perrnot | |
| 2005/0181875 | A1 | 8/2005 | Hoehne | |
| 2005/0278669 | A1 | 12/2005 | Sidle et al. | |
| 2005/0289651 | A1* | 12/2005 | Fages et al. | 726/23 |
| 2006/0032905 | A1 | 2/2006 | Bear et al. | |
| 2006/0116970 | A1* | 6/2006 | Scherzer et al. | 705/74 |
| 2007/0124519 | A1* | 5/2007 | Lin | 710/74 |
| 2008/0004904 | A1* | 1/2008 | Tran | 705/2 |
| 2008/0005788 | A1* | 1/2008 | Ramaswamy et al. | 726/4 |

FOREIGN PATENT DOCUMENTS

| | | |
|---|---|---|
| EP | 0886 246 A3 | 12/1998 |
| EP | 1 811 464 | 7/2007 |
| WO | WO 01/16759 | 3/2001 |

OTHER PUBLICATIONS

Dougherty et al., "Specifying and reasoning about dynamic access-control policies",Third International Joint Conference, IJCAR 2006, Department of Computer Science, WPI, 15pp.*

S.C. Johnson, "Yacc: Yet Another Compiler-Compiler", Technical Report, Murray Hill, Jul. 31, 1978, 33 pp.

S. Jajodia et al., "Flexible Support for Multiple Access Control Policies", ACM Transactions on Database Systems, vol. 26, No. 2, Jun. 2001, pp. 214-260.

E. Bertino et al., "An Access Control Model Supporting Periodicity Constraints and Temporal Reasoning", ACM Transactions on Database Systems, vol. 23, No. 3, Sep. 1998, pp. 2.

M. Abadi et al., "A Calculus for Access Control in Distributed Systems", ACM Transactions on Programming Languages and Systems, vol. 15, No. 3, Sep. 1993, pp. 706-734.

J. Glasgow, "A Logic for Reasoning About Security", ACM Transactions on Computer Systems, vol. 10, No. 3, Aug. 1992, pp. 226-264.

Charles Donnelly et al., "Bison The YACC-compatible Parser Generator (Reference Manual)", Free Software Foundation, Nov. 1995, Bison Version 1.25.

D. Kozen, "Automata and Computability," Springer-Verlag, 1997, pp. 14-127, chapter titled "Finite Automata and Regular Sets".

A. V. Aho et al., "Compilers Principles, Techniques and Tools", Addison-Wesley, 1986, pp. 25-278, chapters 2, 3 and 4.

Nils Klarlund et al., "MONA Version 1.4 User Manual", BRICS, Basic Research in Computer Science, Jan. 2001, 83 pp.

Jesper G. Henriksen et al., "MONA: Monadic Second-Order Logic in Practice", BRICS, Basic Research in Computer Science, RS-95-21, May 1995, 20 pp.

Anders B. Sandholm et al., "Distributed Safety Controllers for Web Services", BRICS, Basic Research in Computer Science, RS-97-47, Dec. 1997, 15 pp.

Jean-Francis Michon et al., "Automata and Binary Decision Diagrams", Automata Implementation Lecture Notes in Computer Science, Springer-Berlin Heidelberg 1999, vol. 1660.

W. Rank et al., Smart Card Handbook, 3rd ed. Jan. 1, 2003, J Wiley & Sons Ltd, pp. 165-169, retrieved from Internet Jan. 15, 2008.

"Smart Cards" by Cornerstone Lab, from www.c-lab.com/smartCard.html, posted on the internet on Jan. 25, 2005.

"Internet Archive Wayback Machine" shows Jan. 25, 2005 posting of "Smart Cards" by Cornerstone Lab.

Enrique Ortiz, "An Introduction to Java Card Technology—Part 1", May 29, 2003.

Ronald M. Kaplan, "Finite State Technology", Xerox Palo Alto Research Center, posted on the internet Sep. 9, 1999.

Wayback Machine Search showing "Finite State Technology" posting from Sep. 9, 1999.

Oliveira et al., "Exact Minimization of Binary Decision Diagrams Using Implicit Techniques", IEEE Transactions on Computers, vol. 47, No. 11, Nov. 1998.

An Introduction to Role-Based Access Control, NIST/ITL Bullentin, Dec. 1995, 6 pgs.

Kenneth Short, "Embedded Microprocessor Systems Design: An Introduction Using the Intel 80C188EB", copyright 1998.

Helleseth et al., "Security of Jump Controlled Sequence Generators for Stream Ciphers", SETA 2006, LNCS 4086, pp. 141-152, Sep. 21, 2006.

Sheldon Akers, "Binary Decision Diagrams", IEEE Transactions on Computers, vol. C-27, No. 6, Jun. 1978.

* cited by examiner

```
Build Automaton(graph){

        left Automaton = NULL;
        right Automaton = NULL;
        root = Root Of (graph);

        If (left - child (graph)! = NULL){
                left  Automaton = Build Automaton (left - child (graph));
        }
        If (right - child (graph)! = NULL){
                right  Automaton = Build Automaton (right - child (graph));
        }
        Resolve (root, left Automaton, right Automaton);
}
Resolve (root, left Automaton, right Automaton){
        Switch (root is of the form){
                Qa (x): Build Q(a, x, automaton);
                x ≤ y: BuildxLTEy (x, y, automaton);
                x ∈ X: BuildxinX (x, X, automaton);
                ∃x: Projection Operation (x, automaton);
                ∃X: Projection Operation (X, automaton);
                ∧: And Operation (automaton1, automaton2);
                ∨: Or Operation (automaton1, automaton2);
                ¬: Not Operation (automaton);
        }
}
```

*Fig. 3*

POLICY LANGUAGE AND STATE MACHINE MODEL FOR DYNAMIC AUTHORIZATION IN PHYSICAL ACCESS CONTROL

TECHNICAL FIELD

The technical field of this application concerns a language that is useful in specifying dynamic and/or context-dependent policies for enforcing physical access control, and/or an automata used to formalize these policies in a executable form.

BACKGROUND

Existing access control systems for physical access control (i.e., systems that grant/deny access to restricted areas such as rooms) rely on a centralized architecture to make the grant/deny decisions. Specifically, the access points such as doors to the restricted areas of a facility are equipped with readers which are connected to a centrally located controller. A user requests access to a particular restricted area by presenting an identification device such as an access card to a reader. Upon reading the identification device, the reader communicates the information read from the identification device to the centralized controller. The centralized controller makes the grant/deny decision and communicates this decision back to the reader which, in turn, implements the decision by suitably controlling an entrance permitting device such as a door lock.

Access control policies are used by the centralized controller to determine whether users are to be granted or denied access to the restricted areas. These access control policies for all users are typically stored explicitly in an Access Control List (ACL), and the controller's decision to grant or deny access to a particular user is based on a lookup into this list. Currently, Access Control Lists are static structures that store all of the policies for all of the users. Such policies might provide, for example, that user A can be allowed access to room R, that user B cannot be allowed access to room S, etc.

Centralized access control systems with static policy specifications as described above cannot be scaled up effectively to meet the requirements for the secure protection of large facilities such as airports, stadia, etc. that have a large number of users. Such facilities instead require dynamic (as opposed to static) access control policies that are context/state dependent. Dynamic access control policies that are context/state dependent specify grant/deny access to users based on dynamic events such as the occupancy of a room being limited to its capacity, the time of an access request being between particular temporal values, etc. Examples of context sensitive policies include (i) limiting access to a restricted area to not more than 20 users at any one time (according to which access is allowed to a requesting user as long as the occupancy of the restricted area is 20 or less and is otherwise denied), (ii) user A is allowed into a restricted area only if supervisor B is present in the restricted area, etc.

There is a need for a formalistic specification language that can be used to specify dynamic policies. These policies can then be "analyzed" and stored in a memory or other suitable structure as an execution model. This execution model may be an automaton and can be used to make an allow/deny decision in response to every access request. The policy language and the execution model should be devised in such a way that they are applicable for de-centralized access control frameworks and also are amenable to centralized execution.

As an example, the above requirements can be met by (1) a formal logical language that is used to specify access control policies whose context varies dynamically, and (2) an executable state machine model that is used to implement the policies specified using the formal logical language.

SUMMARY OF THE INVENTION

According to one aspect of the present invention, a method is implemented on a computer for producing an automaton capable of providing an access control decision upon receiving an access control request. The method comprises the following: accepting context based access control policies specified in a formal descriptive language, processing the context based access control policies specified in the formal descriptive language; and, converting the context based access control policies to the automaton.

According to another aspect of the present invention, a method is implemented on a computer for producing finite state automata capable of providing an access control decision upon receiving an access control request. The method comprising the following: reading context based access control policies specified in a formal descriptive language; converting the context based access control policies specified in the formal descriptive language to Monadic Second Order formulae; and, converting the Monadic Second Order formulae to the finite state automata.

BRIEF DESCRIPTION OF THE DRAWINGS

These and other features and advantages will become more apparent from the detailed description when taken in conjunction with the drawings in which:

FIG. 3 illustrates pseudo code of an example policy analyzer algorithm useful in explaining features of the present invention;

DETAILED DESCRIPTION

Figure 1:
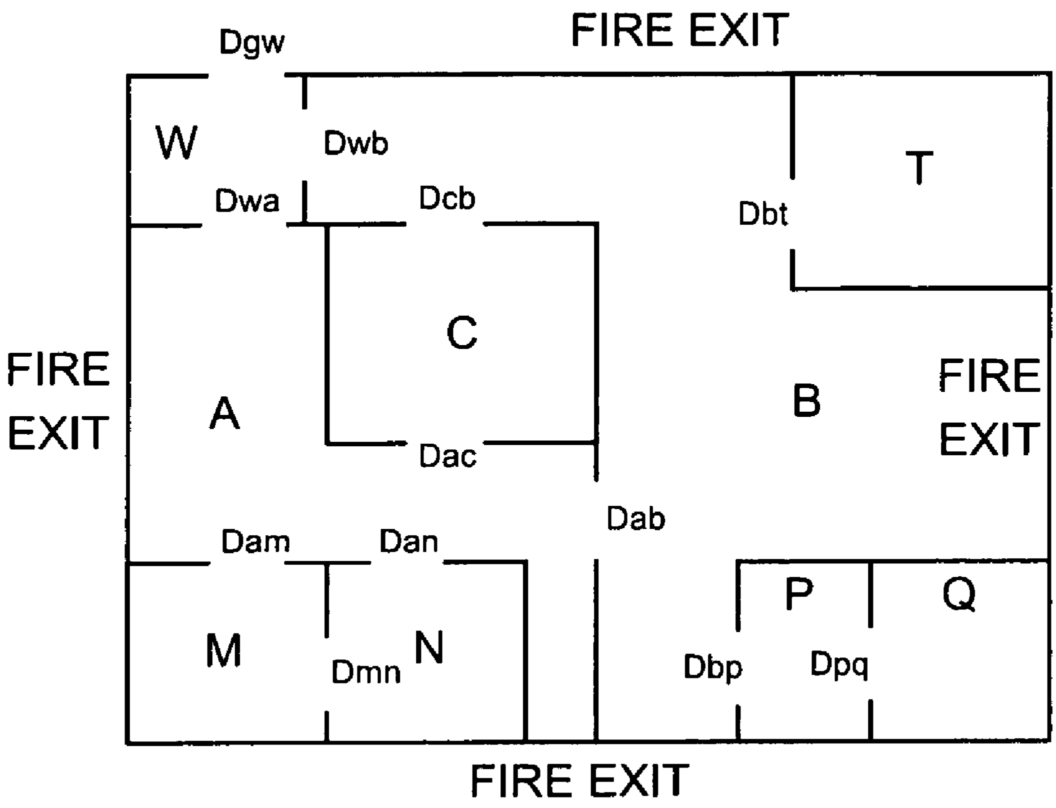
FIG. 1 illustrates an example topology of a facility that can be protected by an access control system.

A formal event-based specification language is described herein that is useful in specifying policies. This specification language is expressive for a useful range of policies in access control and provides a terse description of complex policies. The language is amenable to execution through equivalent finite state automata that act as machine models of the policies specified using the specification language. This specification language can be exploited to derive frameworks for access control that provide support for dynamic policies.

The language and/or the automata implementing the policies specified by the language are applicable in any physical access control architecture where the need arises to enforce access decisions based on dynamically changing parameters. The access control policies can be converted into their equivalent execution models (automata) and can be enforced by placing these models in appropriate access control devices such as access cards and/or readers/door controllers.

Thus, a logical language is disclosed herein and can be used to specify dynamic policies. Also, a state machine model is disclosed that accepts precisely those behaviors that adhere to the dynamic policies. The behavior of the access control system is described by sequences of events. Events are atomic entities that represent basic computations. Examples of events include a request by a particular user for access to a room R, an occurrence of fire in one or more rooms, the occupancy of a room reaching its capacity, etc.

Additional policy examples include (i) user A being allowed entry into room R only if a supervisor entered it q seconds earlier and is present in room R, (ii) the door of lobby L being opened for entry only if the doors of all inner rooms are open.

Formulas of the logical language are used to write policies that describe properties of the sequence of events representing the behaviors and that partition the set of behaviors into those that are those valid and those that are invalid with respect to the policies. A Monadic Second Order Logic, for example, which is parameterized by the set of events, can be used as the logical language to specify the desired policies.

The logic has variables that are instantiated by events. The logical language also has atomic formulas that relate to the occurrence of a particular event and the order of occurrence of two events.

The formulas of the logic describe policies and are built upon the atomic formulas by the use of operators, including conjunction and negation, and by quantifying the variables.

Finite state automata are used as state machine models for executing the policies. As is well known, a finite state machine possesses a finite set of states and transitions. The transitions dictate how a change is made from one state to another in response to a particular event.

Automata that are constructed based on the policies specified by the language described herein are then arranged to act as execution models for these policies in the following manner: given a specified policy or a set of specified policies, a "policy analyzer" algorithm constructs a finite state automaton that accepts precisely those behaviors that satisfy the specified policy or set of specified policies. This algorithm is defined by inducting on the structure of the formula representing the policy. The inductive proof exploits the fact that the set of behaviors accepted by the finite state automata are closed under operations of union, intersection, complementation, and projection.

A physical access control system deals with granting or denying access by users to restricted areas (e.g., rooms/locations). A physical access control system comprises subjects, objects, and policies. Subjects are entities that represent users who are trying to gain access to certain restricted locations, typically rooms. Subjects are subsequently referred to herein as users. Objects (or resources) represent, for example, restricted areas such as rooms into which users are requesting access. Objects are subsequently referred to herein variously as restricted areas or rooms. Policies are rules that dictate whether a user is granted or denied access to enter a certain restricted area.

In typical centralized access control systems, doors of rooms are equipped with readers that are connected to a central controller. Users request access to rooms by presenting their access cards to the readers. Upon reading the cards, the readers communicate information read from the card to the central controller. The central controller makes the grant/deny decision per certain access control policies, communicates the decision to the readers, and these decisions of the central controller are, in turn, enforced by the readers.

As discussed above, policies for all users in a centralized system are stored explicitly in an Access Control List, and the decision of the central controller is based on a lookup into this list. Access Control Lists are static structures that are configured to store policies for every user. Typical policies are user s1 is allowed access to room R, user s2 is not allowed access to room S, etc.

In existing infrastructures, readers have to communicate with the central controller in order to obtain a decision for every access request. This reliance on a central controller inhibits expansion of the access control system to meet the needs of future intelligent facilities that support a very large number of users and that communicate over a distributed network of wired and wireless components.

Consequently, such systems do not scale up adequately to meet the requirements for securing such large and sensitive facilities as airports, stadia, etc. These facilities require dynamic access control policies that are context/state dependent, i.e., policies that grant/deny access to users based on dynamic events such as whether or not the occupancy of a room is equal to its capacity, whether or not there is an occurrence of a fire, etc.

Static policies represented by Access Control Lists are not expressive enough to represent dynamic rules. An attempt could be made to exhaustively list all of the various scenarios that describe the context that will foreseeably result in access being granted or denied in response to a request, but this exhaustive listing would result in an Access Control List of potentially infinite size.

Other approaches, such as present day solutions that combine intrusion detection and access control, depend on "special" if-then-else rule specifications of limited expressibility that necessitate the central controller to query the intrusion detection module prior to giving access. Such solutions work on a case by case basis and do not have a framework for generic specification of context-dependent policies.

What is needed is a language to define complex policies with features to handle various dynamic parameters such as time, context induced by the state of other rooms in the facility, etc. These policies can then by analyzed and stored in an executable form where a reply for each access request is made based on the values of the various influencing parameters.

In order to accommodate such future intelligent large facilities, it would be efficient for the access cards and/or the reader/controllers that are installed at the doors to make the access/deny decisions without requiring communication with a central authority. Such a de-centralized approach can be realized according to one embodiment by making the executable model of the policies amenable to de-centralization, i.e., the model should be generic enough to be implemented over a wide range of access control devices ranging from smart cards to micro controllers.

One approach is to use a formal logical language to specify dynamic access control policies, an executable finite state machine model that implements the policies specified in the formal language, and a policy analyzer that generates state machines by recognizing those behaviors of the system that adhere to the policies.

One formal logical language that can be used for these purposes is a Monadic Second Order (MSO) Logic that is parameterized by the events of the system as the formal language for specifying policies. A language that is useful herein is disclosed by Thomas, W. in "Languages, automata and logic," in Handbook of Formal Languages, Vol. III, Springer, N.Y., 1997, pp. 389-455.

Events of the system depict actions of a user requesting entry into a room, a user being present in a room, occupancy of a particular room reaching its pre-defined capacity, etc.

The logic is built over a countable set of first order and second order variables that are instantiated by events and sets of events, respectively, and a set of atomic formulas that are relation symbols which identify occurrence of events, dictate ordering between events, and indicate membership of an event in a set. Thus, first order variables are used to quantify over a single event, and second order variables are used to quantify over a finite set of events.

The basic building blocks of the policy language that will be used in defining the alphabet of the system are now described. The alphabet constitutes the set of labels for the events of the system. Each label identifies a corresponding event such as requesting access, granting access, denying access, a supervisor entering a room, etc.

According to the syntax of the language, S denotes the set of users (subjects). The set S may, as desired, be partitioned into two subsets TS and PS, denoting temporary users and permanent users, respectively. Permanent users may, as desired, be further classified into normal users, supervisors, directors, etc., by using separate characteristic functions depending on need. For convenience and not necessity, it may be assumed that there exists a finite set User_types={normal, supervisor, director, . . . } of all possible types of users, and a function user_type: $S \rightarrow$User_types that assigns a user to a user type.

Another way of classifying permanent users may be based on a hierarchy that defines the rank/status of each such user. The rank of a user may be used to make a grant/deny access decision regarding a particular room. For example, only those users of a certain type may be allowed access to rooms of a certain type. A hierarchy among users may be defined using a partial ordering of the set PS. If $\leqq$ is a partial order on PS, and if x and y are users such that $x \leqq y$, then y is of a higher rank than x, and policies may dictate that y has access to more rooms than x. Accordingly, user types may be modeled as described above.

Also, according to the syntax, the nomenclature O is used herein to denote a set of objects (e.g., restricted areas (such as rooms), doors, etc.). The following functions are associated with the set O, keeping in mind the typical policies that are used in physical access control.

The nomenclature Room_types is used herein to denote a finite set of room types. Types are used to classify the rooms inside a building. The function room_type: $O \rightarrow$Room_types associates each room with a room type. A room need not necessarily be thought of in a conventional sense and may be thought of more broadly as a restricted area to which access is controlled.

To capture policies that exploit the possibility that each room can have many doors, the set of doors associated with each room may be considered as another basic entity. The nomenclature D is used herein to denote the set of doors of the facility. The one-to-one function doors: $O \rightarrow (2^D \backslash \phi)$ associates a non-empty set of doors with each room. A door need not necessarily be thought of in a conventional sense and may be thought of more broadly as a portal or other access point through which access to a resource is controlled.

Policies may be written as formulas of Monadic Second Order Logic. Formulas are built from atomic formulas which, in turn, are built from terms. Since the logic is parameterized by the set of events/actions of the system, it is beneficial to first define the alphabet of actions.

The set of actions $\Sigma$ includes the following: for $s \in S$, $o \in O$, and $d_o \in$doors(o), the actions req_entry(s, user_type(s), o, room_type(o), $d_o$), allow_entry(s, user_type(s), o, room_type (o), $d_o$) and deny_entry(s, user_type(s), o, room_type(o), $d_o$) are used to represent events corresponding to a user s (of type user_type(s)) requesting entry into restricted area o (of type room_type(o)) through access point $d_o$, to a decision allowing a user s (of type user_type(s)) to enter into restricted area o (of type room_type(o)) through access point $d_o$, and to a decision denying a user s (of type user_type(s)) entrance into restricted area o (of type room_type(o)) through access point $d_o$, respectively.

Similarly, for $s \in S$, $o \in O$, and $d_o \in$doors(o), the actions req_exit(s, user_type(s), o, room_type(o), $d_o$), allow_exit(s, user_type(s), o, room_type(o), $d_o$) and deny_exit(s, user_type(s), o, room_type(o), $d_o$) are used to represent events corresponding to a user s requesting exit from restricted area o through one of its access points $d_o$, to a decision allowing a user s (of type user_type(s)) to exit from restricted area o (of type room_type(o)) through access point $d_o$, and to a decision denying a user s (of type user_type(s)) the right to exit restricted area o (of type room_type(o)) through access point $d_o$, respectively.

For $s \in S$ and $o \in O$, the action "s in o" denotes the fact that the user s is inside the restricted area o.

Other actions may also be similarly formulated. For example, in addition to the above listed actions, there are events which pertain to specific policies. For example, if a policy requires that, at all times, not more than 20 users can be present in a particular room, then the occupancy of the room reaching 20 is modeled through an event which is used in the policy specification. All the events in this category will be those that control access of users to specific rooms. Such events include, for example, an event requiring a supervisor to be present in a room, an event depicting the fact that time is between two values, etc. and will be referred to as context events.

Atomic formulas, such as those mentioned above, are defined as follows: (i) a set of actions $\Sigma$ is fixed, and for each action $a \in \Sigma$, there is a predicate $Q_a(x)$ which represents the fact that the label of an event represented by a first order variable x is a; (ii) for first order variables x, y, the predicate $x \leqq y$ represents the condition that the event corresponding to x occurs before the event corresponding to y in a computation of the system; and, (iii) for a first order variable x and a second order variable X, the atomic formula $x \in X$ represents the fact that the event corresponding to the variable x belongs to the set of events corresponding to X.

In the above, certain assumptions regarding users entering and exiting rooms are optionally made. Thus, if a request from a user to enter a room is granted, it is assumed that the user enters the room. Similarly, if a request from a user to exit a room is granted, it is assumed that the user exits the room. In addition, the user should already be in a room to make a request to exit from it.

Formulas depicting policies are built from the above atomic formulas using the following connectives: (i) Boolean operators $\neg, \vee, \wedge, \Rightarrow,$ and $\equiv$ represent negation, disjunction, conjunction, implication, and equivalence, respectively, and the operators $\wedge$ (conjunction), $\Rightarrow$ (implication), and $\equiv$ (equivalence) can be derived from $\neg$ and $\vee$; and, (ii) the operators $\forall$ (for all) and $\exists$ (there exists) are used to quantify over first and second order variables.

To summarize, the syntax of the policy language is basically Monadic Second Order Logic tuned to the context of access control. As mentioned earlier, the logic is parameterized by events represented as members of the action set $\Sigma$.

The semantics of policies may be defined using words over the alphabet $\Sigma$. Words are finite sequences of actions from the action set $\Sigma$. A formula $\phi$ is interpreted over a word w as follows: an interpretation of first and second order variables is a function I that assigns a letter of $\Sigma$ to each first order variable and a set of letters of $\Sigma$ to each second order variable. These letters occur as positions in a word when a formula (policy) is evaluated over it. For a formula $\phi$, $V_\phi$ may be used to denote the variables that are free variables in the formula $\phi$, i.e., the variables $V_\phi$ are not in the scope of any quantifier in $\phi$. Interpretation is then nothing but a function I: $V_\phi \rightarrow \Sigma$. For a first order variable x, I(x) represents an event from $\Sigma$ as assigned by the interpretation function I. Similarly, for a second order variable X, I(X) represents a set of events from $\Sigma$ as assigned by the interpretation function I. In the context of access control, I(x) could represent the event of a user requesting access to a particular room, and I(X) could represent a set of context events.

The notion of when a word w satisfies a formula $\phi$ under an interpretation I is denoted by $w \models_I \phi$ and is defined inductively as follows:

$w \models_I Q_a(x)$ if and only if I(x)=a.

$w \models_I x \leqq y$ if and only if I(x) occurs before I(y) in the word w.

$w \models_I x \in X$ if and only if $I(x) \in I(X)$.

$w \models_I \neg\phi$ if and only if it is not the case that $w \models_I \phi$.

$w \models_I \phi_1 \vee \phi_2$ if and only if $w \models_I \phi_1$ or $w \models_I \phi_2$.

$w \models_I \exists x \phi$ if and only if there exists an interpretation function I' that extends I by assigning an event to the variable x such that $w \models_{I'} \phi$.

$w \models_I \exists X \phi$ if and only if there exists an interpretation function I' that extends I by assigning a set of events to the variable X such that $w \models_{I'} \phi$.

The semantics of every formula $\phi$ is defined inductively on the structure of the formula as above. A word w satisfies the atomic formula $Q_a(x)$ under an interpretation I if and only if the event assigned to the first order variable x by I is a. A word w satisfies the atomic formula $x \leqq y$ under an interpretation I if and only if the position of the event assigned to x occurs before the position of the event assigned to y by I. A word satisfies the atomic formula $x \in X$ under an interpretation I if and only if the event assigned to the first order variable x by I belongs to the set of events assigned to the second order variable X by I.

Similarly, a word w satisfies the formula $\neg\phi$ under an interpretation I if and only if it is not the case that w satisfies the formula $\phi$. A word w satisfies the formula $\phi_1 \vee \phi_2$ under an interpretation I if and only if it satisfies at least one of the formulas $\phi_1$ or $\phi_2$ under I. Finally, a word w satisfies the formula $\exists x \phi(\exists X \phi)$ under an interpretation I if and only if there is another interpretation function I' that extends I by assigning an event (or a set of events) to x (or X) such that w satisfies the formula $\phi$ under the new interpretation function I'.

In the context of access control, an interpretation function I could, for example, assign a first order variable to a "request for access" event.

A sentence is a formula without any free variables, i.e., all the variables occurring in the formula are bound by a quantifier. Sentences can be assigned semantics without any interpretation function. As desired, the policy language used in a physical access control system may be such that all policies will be sentences in Monadic Second Order Logic.

In discussing the details regarding using Monadic Second Order Logic as the language for configuring access control policies of a facility, it may be optionally assumed that information regarding the topology (rooms, their neighbors, doors, etc.) of the facility and information regarding the users using the facility are available to an administrator configuring the policies. To justify the fact that Monadic Second Order Logic is an event-based language, it may first be noted that events are entities that represent access control requests, decisions, and context. All the events describing context are "programmable" in each controller/relevant access control device. Thus, context related events can be realized as physical events along with the events of users requesting access and being granted/denied access.

An interface may be provided such that a template-based English specification of policies can be configured by an administrator using Monadic Second Order Logic to specify policies. A high-level policy analyzer entity then converts these English templates into their equivalent Monadic Second Order Logic formulas, making it user-friendly. The template based configuration of policies is done such that it supports role based access control, where the roles of users are defined based on the policies that are being enforced on them. The template based configuration and Monadic Second Order logic are also expressive enough to encode static policies as specified using Access Control Lists. For example, user A can always enter room R. Note that the context becomes empty in such a case.

Care should also be taken to ensure that the Monadic Second Order Logic formulas constitute a compact representation of access control policies. For example, using the fact that, in physical access control, a reply to an access request can only be either allow or deny, certain assumptions can be made to the effect that, in the absence of any explicit policy, the reply to a request will be a denial by default (or an allowance by default). This assumption can then be programmed into the controllers, and an exhaustive listing of when to allow or deny upon request to each room can be avoided.

The following demonstrates the usage of the language as described above for specifying policies, using the facility of FIG. 1 as an example. From FIG. 1, it is clear that the set O of rooms is {W, A, B, C, M, N, P, Q, T}, and that the set D of doors of the facility is given by $D=\{D_{100\ W}, D_{WA}, D_{WB}, D_{CB}, D_{AC}, D_{AM}, D_{AN}, D_{MN}, D_{AB}, D_{BT}, D_{BP}, D_{PQ}\}$. This information is made available as a part of the high-level policy analyzer module. The various events that constitute the alphabet $\Sigma$ will be detailed as and when the policies in which they are used are described.

Some dynamic policies involving various parameters like time, context imposed by the state of other rooms, etc., are presented below along with the formulas specifying them.

For the sake of readability, for $a \in \Sigma$ and a variable x, the notation a(x) is used to denote the predicate $Q_a(x)$. Also, in the formulas below, the relation < denotes the immediate successor of the relation $\leqq$ and is defined as follows: for variables x, y, $x<y$ if and only if $(x \leqq y) \wedge \neg\exists z((x \leqq z) \wedge (z \leqq y))$. In words, x occurs immediately before y if and only if x occurs before y and there does not exist any z that occurs after x but before y.

The policies described below are defined on a per user basis, i.e., they describe rules for access of a single user at a time. In the action symbols described below, whenever the user/room type is not explicitly mentioned by the policy, we use the symbol _ to represent the fact that it is applicable to each user/room (with the user/room type instantiated accordingly).

As the examples indicate, the policies have the structure of an initiating access request action followed by a description of the context and a decision based on its truth or falsity.

Anti-pass back: An example of this policy reads in English as follows: A user s cannot enter from $\phi$ to W if the user s has a record of entering W through $D_{\phi W}$ but not exiting W. The Monadic Second Order Logic specification of this policy is given by the following formula:

$$\forall x([\text{req-entry}(s, \_, W, \_, D_{\phi w})(x) \wedge \exists y((s \text{ in } W(y) \wedge (y \leq x)) \wedge \exists z \neg \text{allow-exit}(s, \_, W, \_, D_{\phi W})(z) \wedge ((y \leq z) \wedge (z \leq x)))] \Rightarrow \exists x'((x \leq x') \wedge \text{deny-entry}(s, \_, W, \_, D_{\phi w})(x'))).$$

The above policy reads as follows: For every event of the form req-entry(s, _, W, _, $D_{\phi W}$) represented by the first order variable x (using the atomic formula req-entry (s, _, W, _, $D_{\phi W}$)(x)), and the context defined by the presence of the first order variable y occurring before x representing the fact that the user s was present in the room W (using the atomic formula s in W (y)) and the absence of the first order variable z occurring between y and x, representing the fact that the user s was not allowed exit from W (using the formula ¬allow-exit (s, _, W, _, $D_{\phi W}$) (z)) through the door $D_{\phi W}$, the access decision taken is a deny represented by the first order variable x' occurring after x (using the atomic formula deny-entry (s, _ W, _, $D_{\phi W}$) (x')).

A policy regarding interlocking of doors might read in English as follows: $D_{BP}$ can open if $D_{PQ}$ is closed.

In the following, it is assumed that a door is open if and only if it allows entry and exit to all requesting subjects. A door D being closed is modeled by (the generation of) an event closed(D). The event not-closed(D) represents the "negation" or "dual" of the event closed(D) (a member of $\Sigma$). The two formulas below capture the scenarios corresponding to entry and exit, respectively.

$$\forall x([\text{req-entry}(s, \_, P, \_, D_{BP})(x) \wedge \exists y(\text{closed}(D_{PQ})(y) \wedge (y \leq x)) \wedge \neg \exists z \text{ not-closed}(D_{PQ})(z) \wedge ((y \leq z) \wedge (z \leq x))] \Rightarrow \exists x'((x \leq x') \wedge \text{allow-entry}(s, \_, P, \_, D_{BP})(x')).$$

$$\forall x([\text{req-exit}(s, \_, P, \_, D_{BP})(x) \wedge \exists y(\text{closed}(D_{PQ})(y) \wedge (y \leq x)) \wedge \neg \exists z \text{ not-closed}(D_{PQ})(z) \wedge ((y \leq z) \wedge (z \leq x))] \Rightarrow \exists x'((x \leq x') \wedge \text{allow-exit}(s, \_, P, \_, D_{BP})(x')).$$

Similarly, for the policy which states that $D_{PQ}$ can open if $D_{BP}$ is closed, two Monadic Second Order Logic formulas can be written describing the scenario relating to entry and exit of subjects.

A policy regarding assisted access might read in English as follows: a normal user cannot enter/exit Q without an administrator having entered/exited it q seconds before. The following assumptions are made before defining the formula corresponding to this policy: an administrator entering the room Q is modeled by an event adm-ent(Q), and the fact that more than q seconds have elapsed since his/her entry is modeled by another event adm-$ent_q$(Q). The following Monadic Second Order Logic formula then captures the assisted access policy.

$$\forall x([\text{req-entry}(s, \text{normal}, Q, \_, D_{PQ})(x) \wedge \exists y(\text{adm-ent}(Q)(y) \wedge (y \leq x)) \wedge \neg \exists z(\text{adm-ent}_q(Q)(z) \wedge ((y \leq z) \wedge (z \leq x))] \Rightarrow \exists x'((x \leq x') \wedge \text{allow-entry}(s, \text{normal}, Q, \_, D_{PQ})(x'))).$$

Again, to capture the corresponding policy related to exit, it is assumed that there are events adm-exit(Q) and adm-$exit_q$(Q) that capture administrator exiting Q and exiting Q q seconds before, respectively. The Monadic Second Order Logic specification of the policy then reads as $$\forall x([\text{req-exit}(s, \text{normal}, Q, \_, D_{PQ})(x) \wedge \exists y(\text{adm-exit}(Q)(y) \wedge (y \leq x)) \wedge \neg \exists z(\text{adm-exit}_q(Q)(z) \wedge ((y \leq z) \Rightarrow (z \leq x))] \wedge \exists x'((x \leq x') \wedge \text{allow-exit}(s, \text{normal}, Q, \_, D_{PQ})(x'))).$$

A counter policy is that no normal user can enter C from either $D_{AC}$ or $D_{BC}$ if the number of subjects in C is more than its capacity. The fact that the number of users in the room C exceeds its capacity is modeled by an event $C_{max}$. The following formula then states the above policy.

$$\forall x(C_{max}(x) \Rightarrow \forall y((x \leq y) \wedge \text{req-entry}(s, \text{normal}, C, \_, D_{AC}) \wedge (\neg \exists z((x \leq z) \wedge (z \leq y)) \wedge \text{not-}C_{max}(z)) \Rightarrow \exists x'((y < x') \wedge \text{deny-entry}(s, \text{normal}, Q, \_, D_{AC})(x'))))).$$

$$\forall x(C_{max}(x) \Rightarrow \forall y((x \leq y) \wedge \text{req-entry}(s, \text{normal}, C, \_, D_{BC}) \wedge (\neg \exists z((x \leq z) \wedge (z \leq y)) \wedge \text{not-}C_{max}(z)) \Rightarrow \exists x'((y < x') \wedge \text{deny-entry}(s, \text{normal}, Q, \_, D_{BC})(x'))))).$$

In a temporal policy, normal users can enter room T only between times $T_1$ and $T_2$ everyday. The fact that current time is between $T_1$ and $T_2$ is modeled by an event time ($T_1$, $T_2$).

The following formula then captures the policy:

$$\forall x([\text{req-entry}(s, \text{normal}, T, \_, D_{BT})(x) \wedge \exists y(\text{time}(T_1, T_2)(y) \wedge (y \leq x)) \wedge \neg \exists z(\text{not-time}(T_1, T_2).(z) \wedge ((y \leq z) \wedge (z \leq x))] \Rightarrow \exists x'((x \leq x') \wedge \text{allow-entry}(s, \text{normal}, T, \_, D_{BT})(x'))).$$

Certain policies for special categories of rooms might dictate that a particular user present his/her card twice to gain entry into the room. The following policy allows entry only on at least two consecutive requests by an user:

$$\forall X([x \in X \wedge y \in X \wedge \text{req-entry}(s, \_, P, \_, D_{BP})(x) \wedge \text{req-entry}(s, \_, P, \_, D_{BP})(y) \wedge (x < y)] \Rightarrow \exists x'((y \leq x') \wedge \text{allow-entry}(s, \_, P, \_, D_{BP})(x')).$$

X is a second order variable in the above policy formula that has two first order variables x and y as its members representing two consecutive requests by a user s into the room P through the door $D_{BP}$.

A machine model may be used to model these policy formulas. As mentioned earlier, Monadic Second Order Logic acts as a descriptive language to specify policies that are context-dependent. In order for the policies specified in Monadic Second Order Logic to be operational in terms of enforcing access, they have to be converted into computational/executable models. These models can then be stored in appropriate locations for execution.

Conventional finite state automata may be used as the machine models that execute policies.

Definition: A finite state automaton over an alphabet $\Sigma$ is a tuple $A=(Q, \Sigma, \rightarrow, I, F)$ where Q is a finite set of states, $I, F \subseteq Q$ is the set of initial and final states, respectively, and, $\rightarrow \subseteq (Q \times \Sigma \times Q)$ is the transition relations between states.

As discussed above, $\Sigma$ is a finite set of actions. An automaton need not have a transition for every action in $\Sigma$. While using these automata as execution models for enforcing access control policies, $\Sigma$ will become the set of actions as used in the policy examples.

The semantics of finite state automata is presented here in terms of its runs on a given input. The input is a word over $\Sigma$. Given a word $w=a_1, a_2, \ldots, a_n$ as an input (i.e., the word w is made up of actions $a_1, a_2, \ldots, a_n$), a run of the finite state automaton A on the word w is a sequence of states $q_0$, $q_1, \ldots, q_n$ such that $q_0 \in I$ and $(q_i, a_i, q_{i+1}) \in \rightarrow$ for i varying from 0 to n. In other words, the action $a_1$ causes the finite state automaton to transition from the initial state $q_0$ to the state $q_1$, the action $a_2$ causes the finite state automaton to transition from the state $q_1$ to the state $q_2$, and so on until the last action $a_n$ causes transition to the state $q_n$. A run is said to be accepting if $q_n \in F$ (i.e., state $q_n$ is a final state of the finite state machine). The language accepted by A is denoted by L(A) and is defined as the set of all those words on which A has an accepting run. Languages accepted by finite state automata are popularly called regular languages.

Thus, finite state automata can be viewed as machine models executing policies specified in Monadic Second Order Logic. A policy analyzer constitutes the set of algorithms to convert policies specified in Monadic Second Order Logic into their equivalent finite state automata. A policy analyzer algorithm follows well-known theoretical techniques for converting formula into automata. The following theorem from Thomas, W. in "Languages, automata and logic," in Handbook of Formal Languages, Vol. III, Springer, N.Y., 1997, pp. 389-455 can be implemented as an algorithm for the policy analyzer.

Theorem: For every sentence $\phi$, a finite state automaton $A_\phi$ can be constructed such that $L(A_\phi)=\{w \mid w \models \phi\}$.

The above theorem is proven by induction on the structure of $\phi$ (as obtained from the syntax of the Monadic Second Order Logic). The policy analyzer algorithm may be arranged to follow the same inductive structure of the proof. The inductive proof uses results involving closure properties of the class of regular languages which are standard results and can be obtained from any book on the Theory of Computation such as, for example, Kozen, D., "Automata and Computability," Springer-Verlag, 1997.

The policy analyzer algorithm works by inductively constructing an automaton based on the structure of the given MSO formula. The structure of an MSO formula $\phi$ is represented using a parse tree $T_\phi$ that captures information about all the atomic formulas and sub-formulas that constitute $\phi$ and also information about how $\phi$ is syntactically built using the various Boolean operators and quantifiers. For example, consider the policy described by the MSO formula below that allows entry of a user into a room A if and only if the context defined by the event Z holds.

$$\forall x, \exists y\_:Z(x) \wedge \text{request-entry-}A(y)\ \neg\exists z:\neg Z(z) \wedge (x<z)$$
$$\wedge (z<y)\_ \Rightarrow \exists w\_:\text{allow-entry-}A(w) \wedge y<w$$
$$\wedge \forall w\_:\text{allow-entry-}A(w) \Rightarrow \exists x,y\_:Z(x)$$
$$\wedge \text{request-entry-}A(y)\ \neg\exists z:Z(z) \wedge (x<y) \wedge (y<z)\_$$
$$\wedge (y\_<w)$$

Figure 2:
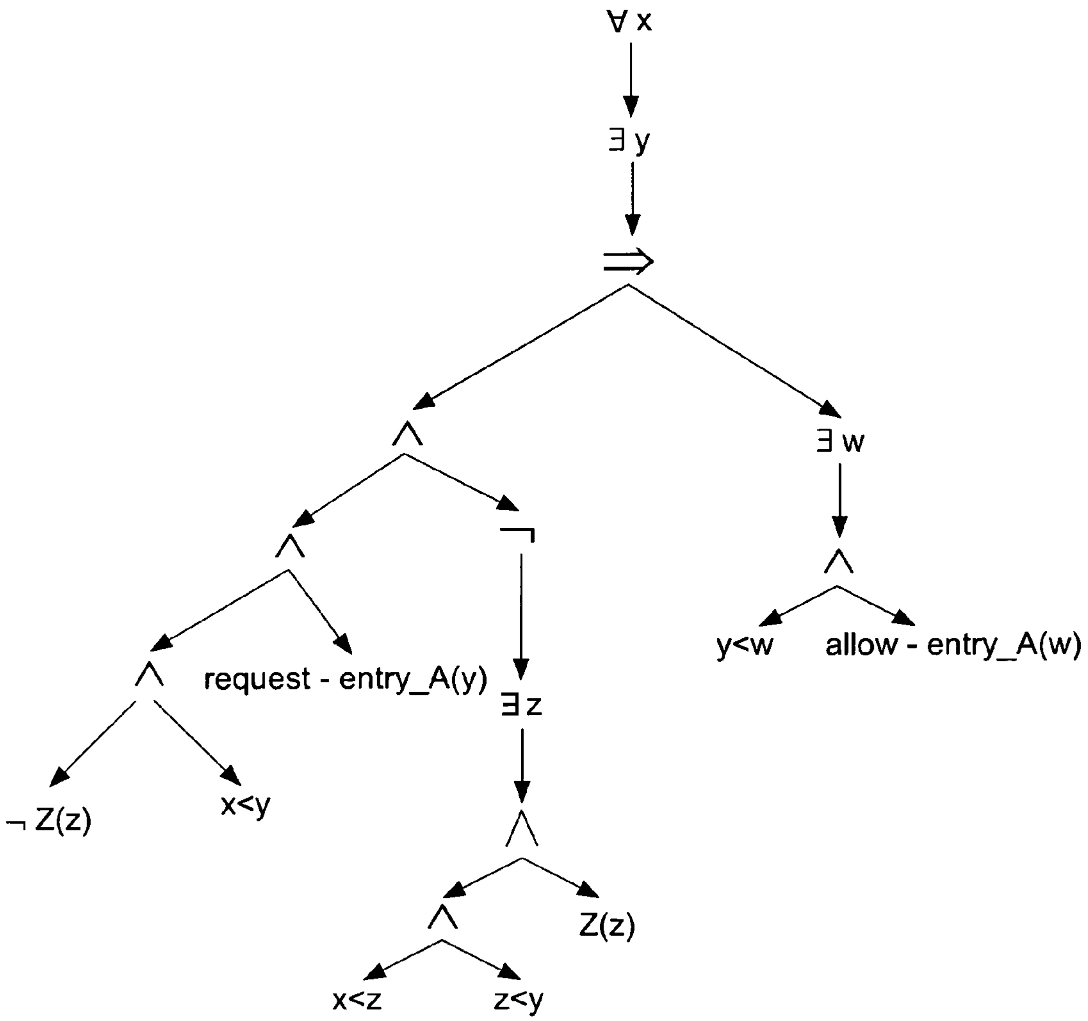
FIG. 2 illustrates a parse tree corresponding to a portion of a policy described below.

The parse tree corresponding to the first outer-most sub-formula (the first three lines of the formula) of the above policy is given in FIG. 2.

Pseudo code of the policy analyzer algorithm is given in FIG. 3, and the algorithm works by traversing the parse tree using a post-order traversal, inductively constructing an automaton for each node. The leaf nodes of the parse tree are atomic formulas, and automata accepting words that satisfy these formula can be constructed using techniques available from Thomas, W. in "Languages, automata and logic," in Handbook of Formal Languages, Vol. III, Springer, N.Y., 1997, pp. 389-455. These techniques correspond to the routines BuildQ, BuildxLTEy, BuildxinX in the pseudo code. The routines take the actions or representatives of the variables from atomic formulas as arguments, and construct and return the corresponding automaton.

The inner nodes of the parse tree are either Boolean connectives or quantifiers. To construct automata for each inner node, the closure operation corresponding to the connective or quantifier is used on the automata corresponding to its children. As mentioned above, the class of regular languages accepted by finite state automata is effectively closed under these operations. There are algorithms available, for example, in Kozen, D., "Automata and Computability," Springer-Verlag, 1997, that can be used to construct automata effectively implementing the closure properties. These algorithms correspond to the routines ProjectionOperation, AndOperation, OrOperation, and NotOperation that are used in the pseudo code. These routines again take the corresponding automata and variable information as needed and return the automaton corresponding to the closure operation.

Figure 4:
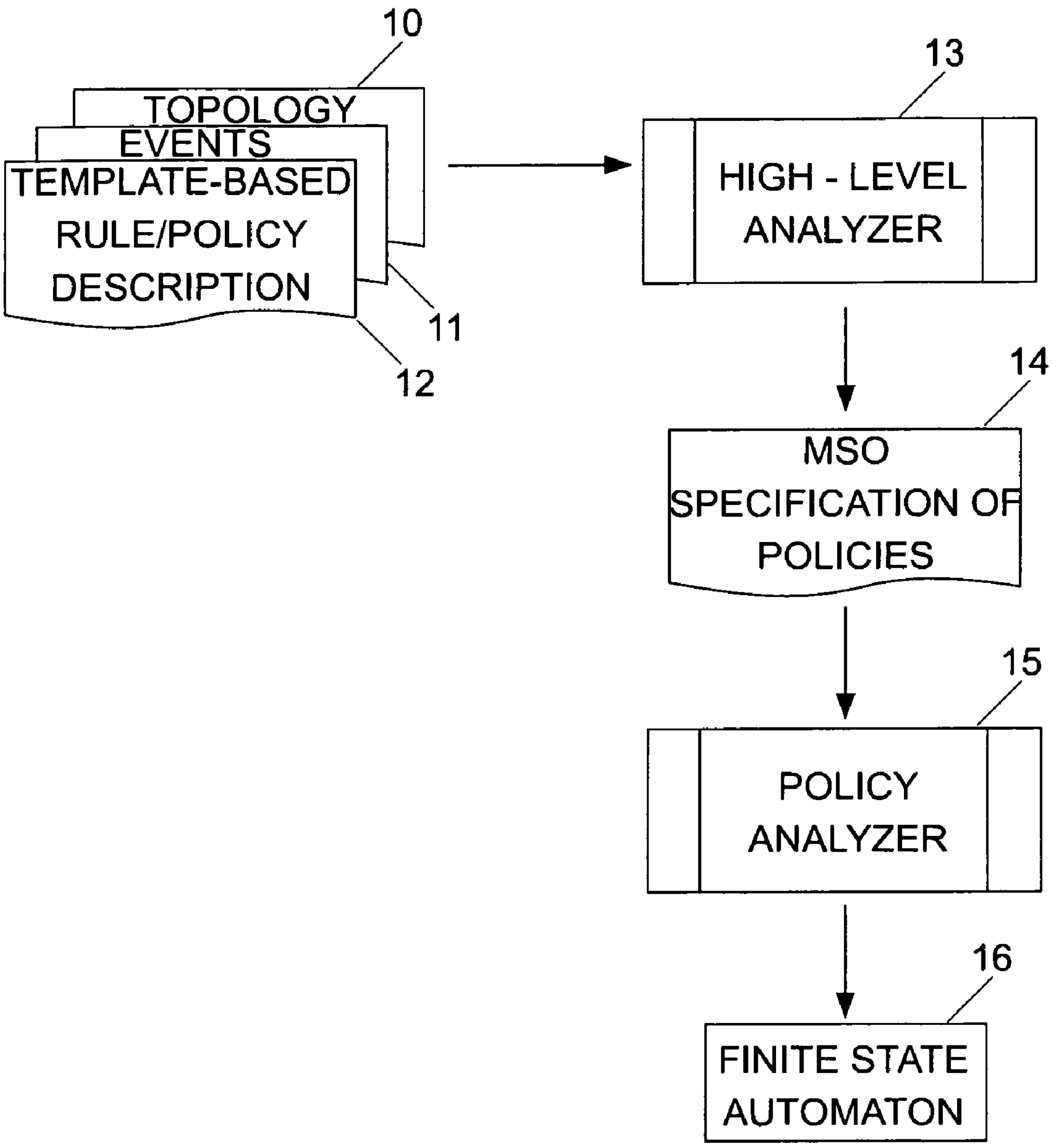
FIG. 4 is a flow chart illustrating the manner in which policies are implemented an execution model for an access control system.

FIG. 4 summarizes the full high-level policy analyzer algorithm for configuring the policies followed by the policy analyzer algorithm that generates the state machines for executing the policies.

The topology 10 of the facility to be protected, the events 11 that are members of $\Sigma$ and include $s \in S$, $o \in O$, and $d_o \in \text{doors}(o)$, and the template based descriptions 12 that are prepared by an administrator and that represent the rules and/or policies to be enforced by the system are input to a high level analyzer 13. These templates are written in English and are defined along with their corresponding Monadic Second Order formulas. The high level analyzer 13 converts the template based descriptions to Monadic Second Order formulas 14 having a structure similar to those described above. For example, the template corresponding to the policy described in the Monadic Second Order Logic formula above is given as:

Can Enter Room A on context Z

The high level analyzer 13 works by first parsing the above templates to extract pieces of templates that can be substituted by pre-designated Monadic Second Order formulas. The Monadic Second Order formulas of the pieces of templates are then put together by the high level analyzer 13 to obtain the overall Monadic Second Order formula 14 corresponding to the policy. The high level policy analyzer 13 uses knowledge of the application domain to effectively perform the translation. This translation can be carried out using well known parsing techniques available from Alfred V. Aho, Ravi Sethi, Jeffrey D. Ullman in "Compilers Principles, Techniques, Tools", Reading, Ma., Addison-Wesley, 1986, and well known tools disclosed by S. C. Johnson in "YACC—Yet another compiler compiler", Technical Report, Murray Hill, 1975, and by Charles Donelly and Richard Stallman in "Bison: The YACC-Compatible Parser Generator (Reference Manual)", Free Software Foundation, Version 1.25 edition, November 1995. Thus, the formulation of application specific templates and the grammar and the consequent construction of the high level policy analyzer 13 can be carried out in accordance with the existing literature as cited above.

Figure 5:
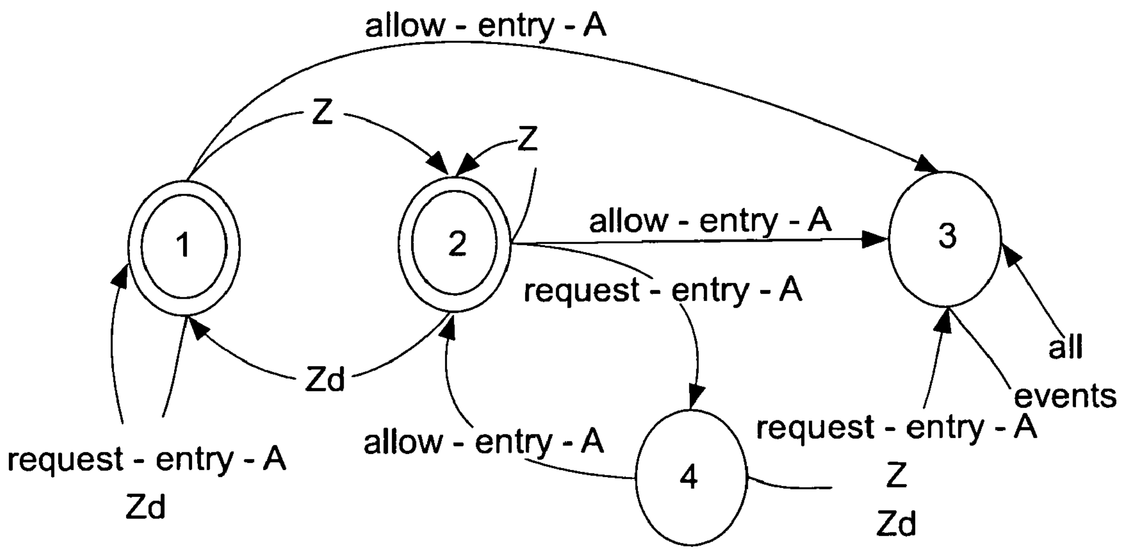
FIG. 5 illustrates a finite state automaton obtained as a result of applying an example policy analyzer to an example Monadic Second Order formula

The Monadic Second Order formulas 14 are now converted by a policy analyzer 15 as described by the pseudo code in FIG. 3 to a finite state automaton 16. FIG. 5 illustrates the finite state automaton obtained as a result of applying the policy analyzer 15 to the Monadic Second Order formula mentioned above. Note that the event $Z_D$ in the automaton represents the negation or dual of the event Z, i.e., the fact that the event Z has not occurred.

The policy analyzer 15 can be used to answer some of the natural questions that arise in the context of access control enforced through policies. One question is whether a set of policies can be enforced on a facility. It may be assumed that a given set of policies can be enforced on a facility if there exists at least one behavior of the system that satisfies all these policies.

Given a set of policies, using the policy analyzer algorithm, an automaton is first constructed that accepts precisely those behaviors that satisfy all the policies. It is easy to see that this set of policies can be enforced on the facility if and only if the associated automaton accepts a non-empty language.

The problem of checking non-emptiness of a regular language is decidable: the policy analyzer 15 operates by checking if there is a path in the transition graph of the automaton from one of the initial states to one of the final states. This problem is decidable and can be implemented using a standard depth first search on the graph of the automaton.

Another question that can be answered as an application of the policy analyzer 15 is that of formally verifying policies. Given a set L of behaviors of a system as a regular language and a set of policies as formulas in the policy language, the problem of model checking is to check if every behavior in L satisfies the policies. This question also turns out to be decidable.

Accordingly, since the given set L is a regular language, it is known that there exists a finite state automaton $A_L$ that accepts the set L. The formula $\phi$ obtained by taking the conjunction of the formulas corresponding to the various given policies is then considered. It is easy to see that each behavior in L satisfies $\phi$ (i.e., satisfies all the policies) if and only if $L \cap L(\neg\phi)=\phi$, where $L(\neg\phi)$ denotes the set of all words that satisfy $\phi$. We know from the policy analyzer 15 that we can construct a finite state automaton $A_{\neg\phi}$ such that it accepts precisely those behaviors that satisfy $\neg\phi$. It is easy to argue that the class of languages accepted by finite state automata is effectively closed under the set-theoretic operation of intersection. Consequently, solving the model checking problem amounts to checking if the finite state automaton accepting $L\Omega L(\neg\phi)$ accepts an empty language, which is again decidable as mentioned above.

The logical event-based language for specifying policies as described herein is expressive enough to specify complex policies involving time, state of other rooms etc. as the examples illustrate. A policy analyzer converts these policies specified in the language into their equivalent finite state automata in the form of machine models. The finite state automata may be stored on smart cards and/or in door controllers/reader of an access control system.

Figure 6:
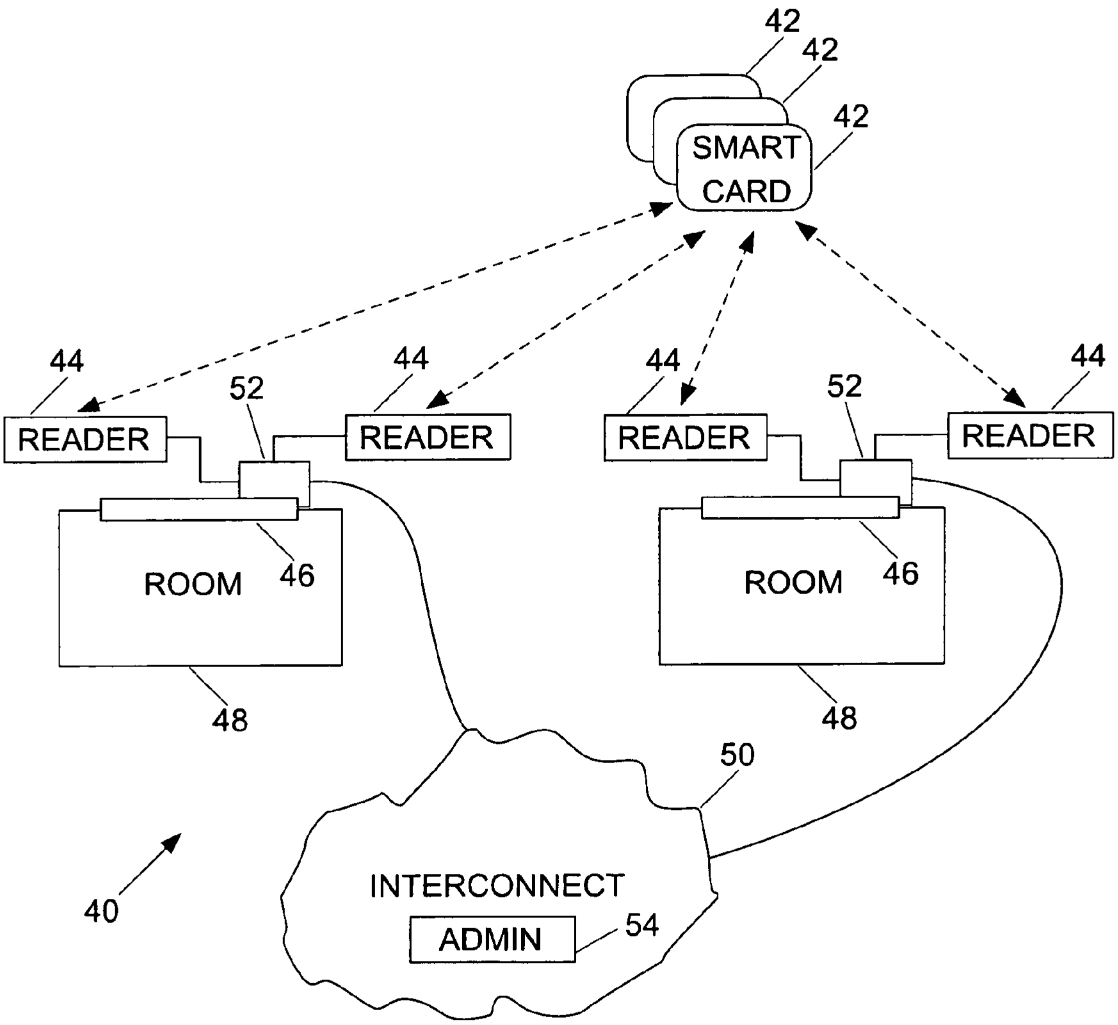
FIG. 6 shows an example of an access control system.

An embodiment of an access control system 40 for the control of access to a building with interconnects is shown in FIG. 6. The access control system 40 implements de-centralized access control (DAC), which is not to be confused with Discretionary Access Control. The de-centralized access control, for example, may be arranged to fall within the domain of non-discretionary access control.

The access control system 40 include user-carried devices 42 (e.g., smart access cards), readers 44 (e.g., device readers), access points 46 (e.g., portals such as doors), resources 48 (e.g., protected areas such as rooms), and an interconnect 50.

The user-carried devices 42 according to one embodiment may have built-in computational capabilities and memories, as opposed to passive cards that are commonly used today. Users are required to carry the user-carried devices 42. The user-carried devices 42 are more simply referred to herein as smart cards. However, it should be understood that user-carried devices can include devices other than smart cards.

The readers 44 at the doors or other portals are able to read from and write to the user-carried devices 42.

The access points 46 are access control enabled. The access points 46 are more simply referred to herein as doors. However, it should be understood that access agents can include vias other than doors. Each of the doors 46, for example, may be arranged to have one or more readers 44. For example, each of the doors 46 may be arranged to have two readers 44 with one of the readers 44 on each side of the corresponding door 46. Also, each of the doors 46, for example, may be arranged to have a door controller 52. The door controller 52 is connected to the reader 44 and has an actuator for locking and unlocking the corresponding door 46. The door controller 52 may have a wireless/locally wired communication component and some processing capabilities.

The resources 48, for example, may be enclosed spaces or other restricted areas. Access to the resources 48 is permitted by the doors 46 with each of the doors 46 being provided with a corresponding one of the door-controllers 52 to control access through a corresponding one of the doors 46 and into a corresponding one of the resources 48.

The interconnect 50 interconnects the door controllers 52 and is typically a mix of wired and wireless components. However, it should be understood that the interconnect 50 may instead comprise only wired components or only wireless components, that the wired components may include optical fibers, electrical wires, or any other type of physical structure over which the door controllers 52 can communicate, and that the wireless components may include RF links, optical links, magnetic links, sonic links, or any other type of wireless link over which the door controllers 52 can communicate.

The smart cards 42 carry the finite state automata pertinent to the corresponding user. Upon an access request, the access decision is made locally by the smart card 42 by virtue of the interaction between the smart card 42, which carries the finite state automata, and the door controller 52, which supplies the context information (such as the current occupancy level of the room). The smart card 42 uses both the finite state automata and the system context in order to make a decision regarding the request for access by user through the door 46.

The interconnect 50 is used to transfer system-level information to the door-controllers 52, as opposed to per-user access request information, and to program the door-controllers 52.

The users are expected to re-program, re-flash, or otherwise alter the finite state automata stored on their smart cards 42 on an agreed upon granularity so that they can reflect any change in policies.

Thus, instead of a central controller storing the entire Access Control List as is done in traditional access control systems, the pertinent portions thereof (i.e., of the policies) are stored on the user's smart card 42 in connection with the access control system 40. The door controller 52 and the smart cards 42 communicate with one another in order to correct execute the finite state automata and hence control access to the room 48.

As indicated above, the finite state automata stored on the smart card 42 may be personal to the user possessing the smart card 42. For example, the smart card 42 of user A may contain a policy specifying that user A is permitted access to a room only if user B is already in the room. However, the smart card 42 of user C may contain no such finite state automata.

As an example, one of the rules might specify that entry into a particular one of the rooms 48 is allowed only if occupancy in this particular room is less then twenty (e.g., the capacity limit of this room). The context is the current occupancy of this room. The door controller 52, which is charged with imposing the system context, maintains a count of the occupants of the room. When a user with a smart card 42 that has a finite state automaton corresponding to the above policy requests access to the room, the policy is evaluated by the smart card 42 after applying the system context which it receives from the door controller 52 and makes the access decision to grant or deny access.

The interconnect 50 may be arranged to include a system administrator 54 some of whose functions are discussed above.

Figure 7:
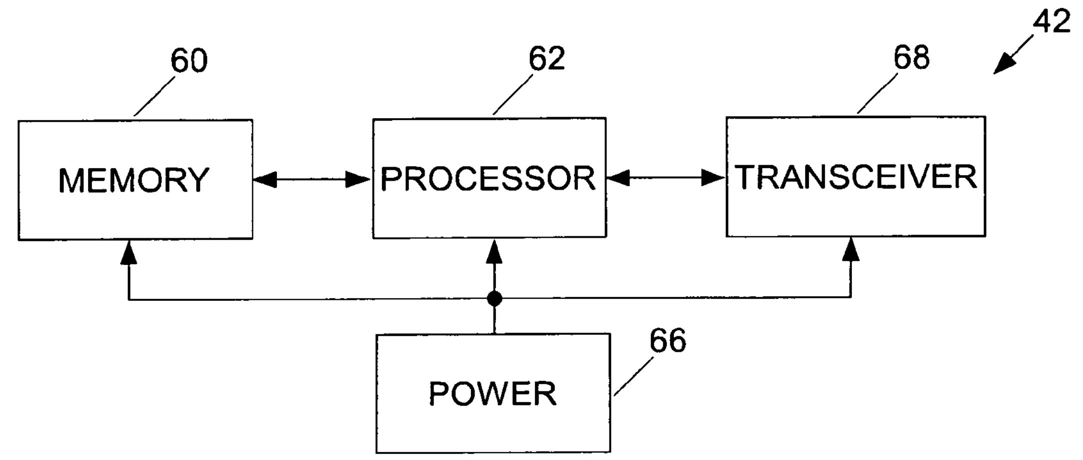
FIG. 7 shows a representative one of the smart cards of FIG. 6.

A representative one of the smart cards 42 is shown in FIG. 7. The smart card 42 includes a memory 60, a processor 62, a transceiver 68, and a power source 66. The memory 60, for example, may be a flash memory and stores the finite state automaton that enforces the policies targeted to the user carrying the smart card 42.

The smart card 42 may be arranged to respond to a generic read signal that is transmitted continuously, periodically, or otherwise by the reader 44, that is short range, and that requests any of the smart cards 42 in its vicinity to transmit its ID, and/or a request for system context, and/or other signal to the reader 44. In response to the read signal, the smart card 42 transmits the appropriate signal to the reader 44.

Accordingly, when the user presents the user's smart card 42 to the reader 44, the transceiver 68 receives from the reader 44 at least the system context provided by the door controller 52. Based on this system context and the finite state automata stored in the memory 60, the processor 62 makes the access decision to grant or deny the user access to the room 48 associated with the reader 44 to which the user's smart card 42 is presented. The processor 62 causes the grant decision to be transmitted by the transceiver 68 to the reader 44. If desired, the processor 62 may be arranged to also cause the deny decision to be transmitted by the transceiver 68 to the reader 44.

The memory 60 may also be arranged to store a personal ID of the user to which the access card is assigned. When the user presents the smart card 42 to the reader 44, the processor 62 may be arranged to cause the user's personal ID to be transmitted by the transceiver 68 to the reader 44. In this manner, particular users may be barred from specified ones of the rooms 48, access by specific users to specific rooms, etc. may be tracked. Also, the door controllers 52 can be arranged to provide back certain system contexts that are targeted to particular users.

The memory 60 can also store other information.

The processor 62, for example, may be a microcomputer, a programmable gate array, an application specific integrated circuit (ASIC), a dedicated circuit, or other processing entity capable of performing the functions described herein.

The power source 66 may be a battery, or the power source 66 may be arranged to derive its power from transmissions of the readers 44, or the power source 66 may be any other device suitable for providing power to the memory 60, the processor 62, and the transceiver 68.

The transceiver 68 transmits and receives over a link 78. The link 78 may be a wired link or a wireless link.

Figure 8:
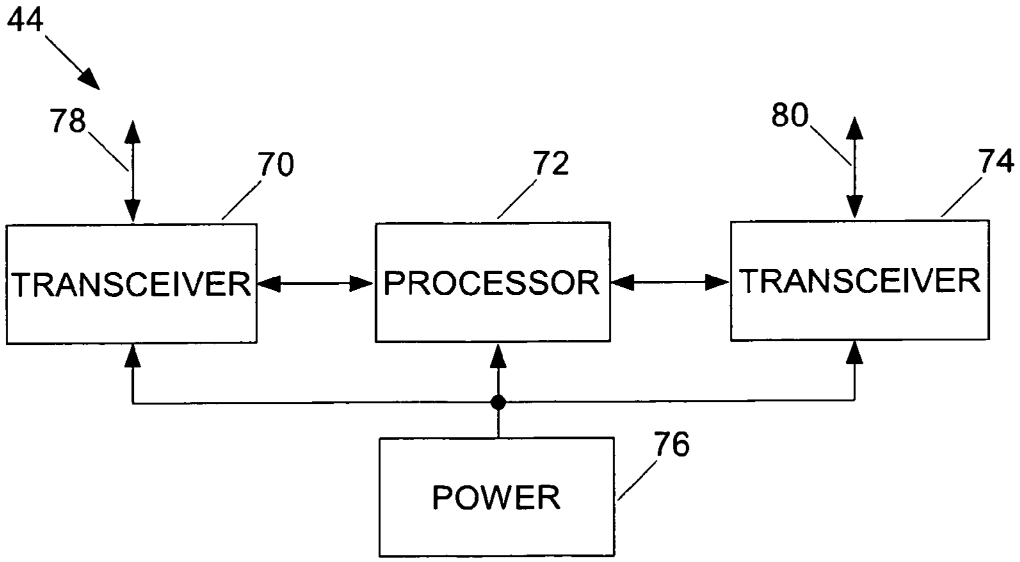
FIG. 8 shows a representative one of the readers of FIG. 6.

A representative one of the readers 44 is shown in FIG. 8. The reader 44 includes a transceiver 70, a processor 72, a transceiver 74, and a power source 76. Although not shown, the reader 44 may also include a memory.

When the user presents the user's smart card 42 to the reader 44, the processor 72 causes the transceiver 74 to send a signal to the door controller 52 that the smart card 42 is being presented to the reader 44. This signal prompts the door controller 52 to transmit appropriate system context to the reader 44. The system context supplied by the door controller 52 is received by the transceiver 74 of the reader 44. The processor 72 causes the system context received from the door controller 52 to be transmitted by the transceiver 70 to the smart card 42. The access decision made and transmitted by the smart card 42 is received by the transceiver 70. The processor 72 causes this decision to be transmitted by the transceiver 74 to the door controller 52.

The processor 72, for example, may be a microcomputer, a programmable gate array, an application specific integrated circuit (ASIC), a dedicated circuit, or other processing entity capable of performing the functions described herein.

The power source 76 may be a battery, or the power source 76 may be a plug connectable to a wall or other outlet, or the power source 76 may be any other device suitable for providing power to the transceiver 70, the processor 72, and the transceiver 74.

The transceiver 70 transmits and receives over the link 78. The link 78 may be a wired link or a wireless link. The transceiver 74 transmits and receives over a link 80. The link 80 may be a wired link or a wireless link.

Figure 9:
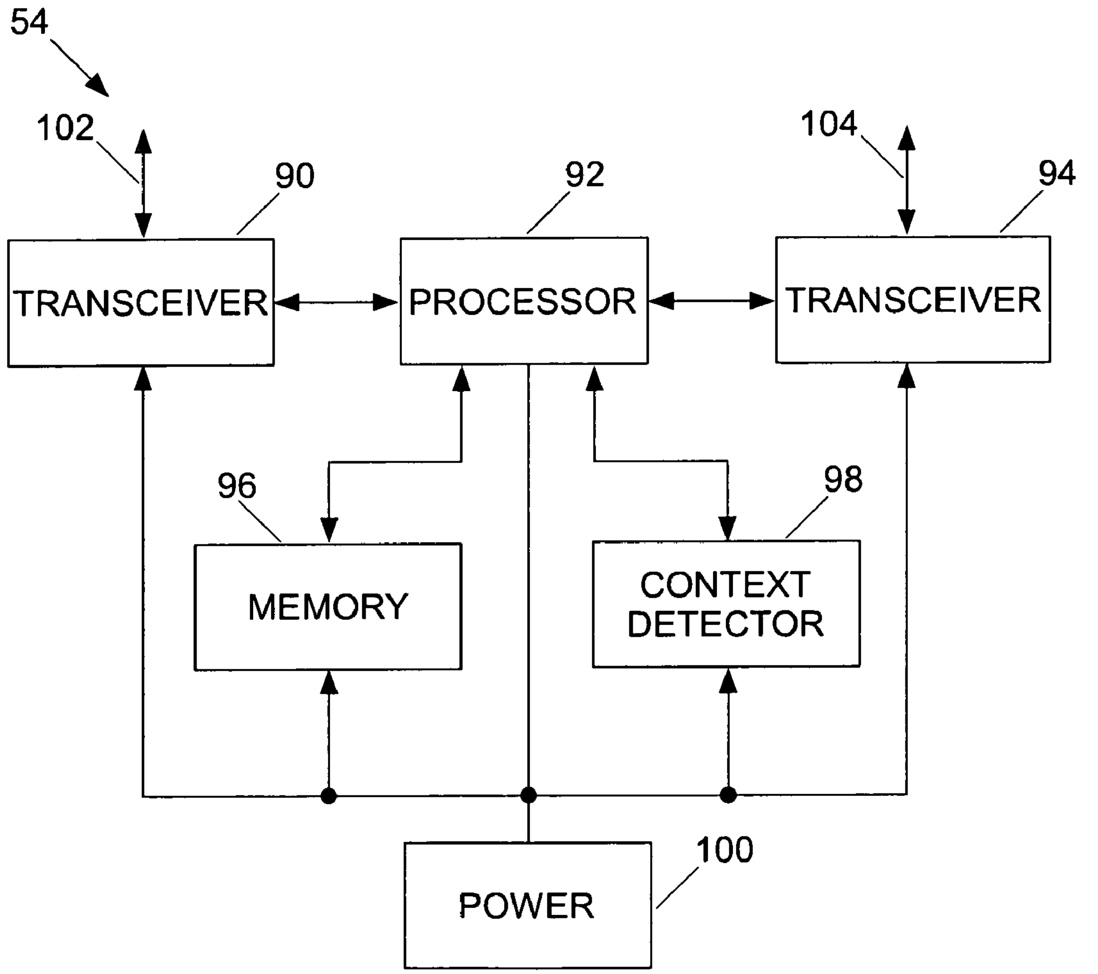
FIG. 9 shows a representative one of the door controllers of FIG. 6.

A representative one of the door controllers 52 is shown in FIG. 9. The door controller 52 includes a transceiver 90, a processor 92, a transceiver 94, a memory 96, one or more context detectors 98, and a power source 100.

When the user presents the user's smart card 42 to the reader 44 and the reader 44 sends a signal requesting the appropriate system context, the transceiver 90 receives this request signal causing the processor 92 to control the transceiver 90 so as to transmit this system context to the reader 44. The system context may be stored in the memory 96. For example, the system context stored in the memory 96 may be user specific and may be stored in the memory 96 by user ID. Thus, when a user's smart card 42 transmits its user ID to the door controller 52 via the reader 44, the door controller 52 transmits back system context specific to the user ID that it has received.

At least a portion of the system context can be provided by the context detector 98. The context detector 98 may simply be a counter that counts the number of users permitted in the room 48 guarded by the door controller 52. However, the context detector 98 may be arranged to detects additional or other system contexts to be stored in the memory 96 and to be transmitted to the reader 44 and then to the smart card 42.

The transceiver 94 is arranged to exchange communications with the interconnect 50.

The processor 92, for example, may be a microcomputer, a programmable gate array, an application specific integrated circuit (ASIC), a dedicated circuit, or other processing entity capable of performing the functions described herein.

The power source 100 may be a battery, or the power source 100 may be a plug connectable to a wall or other outlet, or the power source 100 may be any other device suitable for providing power to the transceiver 90, the processor 92, the transceiver 94, the memory 96, and the context detector 98.

The transceiver 90 transmits and receives over a link 102. The link 102 may be a wired link or a wireless link. The transceiver 94 transmits and receives over a link 104. The link 104 may be a wired link or a wireless link.

Accordingly, context-sensitive policy enforcement is decentralized. Thus, there is no need for controllers to centrally maintain information about per-user permissions and system context. Instead, access control decisions are made locally, with the door-controllers dynamically maintaining pertinent environmental system context. This de-centralization alleviates the problem of scalability as the number of users and the complexity of the policies grow and the need for wireless interconnects increases.

Moreover, the access control system 40 is easy to configure and re-configure. At a high level, the readers 44 and/or the door controllers 52 are equipped with the knowledge of what they are protecting, but not how they are protecting (which is provided by the smart card 42 of each user who wants to access to the rooms 48.) The readers 44 and/or door controllers 52 are stateless in this regard, making reconfiguration of the facility easier.

Further, effective decentralization and localization of policy decision making also enables meaningful enforcement of at least some access control policies in the event of a disconnected or partially connected reader 44 and/or door controller 52. For example, policies depending only on a user's past behavior (and not on other system context) can be enforced even if a door controller 52 is disconnected from the system through the interconnect 50.

Sophisticated approaches exist for secure authorization (albeit not for context-sensitive policies). For example, using symmetric key encryption, where all the access agents and the administrator 54 share a secret key k, with which they will be configured at the time of installation (or on a subsequent facility-wide reset operation, if the key is compromised), the per-user policy engine and states can be encrypted with k on the user-carried devices, and the readers 44 and/or the door controllers 52 can decrypt them using k and further write back encrypted states using k on the user-carried devices. This symmetric key encryption ensures security as long as k is not compromised.

Certain modifications have been discussed above. Other modifications will occur to those practicing in related arts. For example, as described above, the smart cards 42 make the access decision as to whether a user is to be permitted or denied access to a room. The smart card 42 makes this decision based on the finite state automata that it stores and the system context provided by the door controller 52. Instead, the door controller 52 could make the access decision as to whether a user is to be permitted or denied access to a room based on the policies 52 provided by the smart card 42 and the system context stored in the memory 96 of the door controller 52.

Also, the reader 44 and the door controller 52 are shown as separate devices. Instead, their functions may be combined into a single device.

Moreover, the functions of the door controller 52 may be moved to the readers 44 reducing the door controller 52 to a simple lock.

In addition, the connections shown in FIG. 6 may be wired connections, or wireless connections, or a mixture of wired connections and wireless connections.

Furthermore, the door controllers 52 may be arranged to log access decisions in a log file so that the decisions logged in the log file can be subsequently collated by a separate process for book-keeping.

Moreover, as discussed above, the interconnect 50 of FIG. 6 may include the administrator 54. The system administrator 54 may to supply special system contexts that are in addition to any system contexts detected by the context detectors 98. Such special system contexts, for example, may be used to take care of emergency situations including but not limited to revoking the access rights of a rogue user.

Accordingly, the detailed description is to be construed as illustrative only and is for the purpose of teaching those skilled in the art the best mode of carrying out the method and/or apparatus described. The details may be varied substantially without departing from the spirit of the invention claimed below, and the exclusive use of all modifications which are within the scope of the appended claims is reserved.

What is claimed is:

1. A method implemented on a computer for producing an automaton capable of providing an access control decision upon receiving an access control request, the method comprising:

accepting by the computer of context based access control policies specified in a formal descriptive language, wherein the context based access control policies are policies granting/denying access based on dynamic events;

processing by the computer of the context based access control policies specified in the formal descriptive language, wherein the processing of the context based access control policies includes converting the context based access control policies to monadic second order formulas including events and variables; and, converting by the computer of the monadic second order formulas to the automaton.

2. The method of claim 1 wherein the processing of the context based access control policies specified in a formal descriptive language comprises processing the context based access control policies in the form of events.

3. The method of claim 2 wherein the processing of the context based access control policies in the form of events comprises processing the context based access control policies in the form of events specified in terms of a user s, a restricted area o of a secured facility, and an access point d permitting entrance to or exit from the restricted area o.

4. The method of claim 2 wherein the processing of the context based access control policies in the form of events comprises processing the context based access control policies in the form of events specified in terms of a user s, a type of user s, a restricted area o of a secured facility, a type of restricted area o, and an access point d permitting entrance to or exit from the restricted area o.

5. The method of claim 1 wherein the processing of the context based access control policies specified in the formal descriptive language comprises processing access control actions and context specified as events, and wherein the events are included in an alphabet set of the language.

6. The method of claim 1 wherein the automaton comprises a finite state machine.

7. The method of claim 1 wherein the converting of the context based access control policies to formulas including events and variables comprises converting the context based access control policies to formulas including events specified in terms of a user s, a restricted area o of a secured facility, and an access point d permitting entrance to or exit from the restricted area o.

8. The method of claim 1 wherein the converting of the context based access control policies to formulas including events and variables comprises converting the context based access control policies to formulas including events specified in terms of a user s, a type of user s, a restricted area o of a secured facility, a type of restricted area o, and an access point d permitting entrance to or exit from the restricted area o.

9. The method of claim 1 wherein the converting of the context based access control policies to formulas including events and variables comprises converting the context based access control policies to formulas including events, variables, and Boolean operators.

10. The method of claim 1 further comprising:

formally verifying if a set of behaviors of a facility subject to the access control policies represented as formal descriptive language satisfies one or more of the access control policies; and, checking if one or more of the access control policies can be together enforced on a particular facility subject to the access control policies.

11. The method of claim 1 further comprising storing the automaton in memory.

12. The method of claim 11 wherein the storing of the automaton in memory comprises storing the automaton on an identification device carried by a user.

13. The method of claim 11 wherein the storing of the automaton in memory comprises storing the automaton on a door controller.

14. The method of claim 11 wherein the storing of the automaton in memory comprises storing the automaton in a plurality of memories.

15. A method implemented on a computer for producing finite state automata capable of providing an access control decision upon receiving an access control request, the method comprising:

reading by the computer of context based access control policies specified in a formal descriptive language, wherein the context based access control policies comprise policies granting/denying access based on dynamic events;

converting by the computer of the context based access control policies specified in the formal descriptive language to Monadic Second Order formulae; and, converting by the computer of the Monadic Second Order event and variable based formulae to the finite state automata.

16. The method of claim 15 wherein the event based formulae contain terms relating to a user s, a restricted area o of a secured facility, and an access point d permitting entrance to or exit from the restricted area o.

17. The method of claim 15 wherein the event based formulae contain terms relating to a user s, a type of user s, a restricted area o of a secured facility, a type of restricted area o, and an access point d permitting entrance to or exit from the restricted area o.

18. The method of claim 15 wherein the converting of the context based access control policies comprises converting the context based access control policies specified in the formal descriptive language to Monadic Second Order event, variable, and Boolean operator based formulae.

19. The method of claim 15 further comprising storing the finite state automata in memory.

20. The method of claim 19 wherein the storing of the finite state automata in memory comprises storing the finite state automata on an identification device carried by a user.

21. The method of claim 19 wherein the storing of the finite state automata in memory comprises storing the finite state automata on a door controller.

* * * * *